United States Patent
Sveen et al.

(10) Patent No.: US 7,819,073 B2
(45) Date of Patent: Oct. 26, 2010

(54) FLOATING WIND TURBINE INSTALLATION

(75) Inventors: Dagfinn Sveen, Oslo (NO); Finn Gunnar Nielsen, Bønes (NO); Tor David Hanson, Ulset (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 11/921,520

(22) PCT Filed: Jun. 2, 2006

(86) PCT No.: PCT/NO2006/000207

§ 371 (c)(1),
(2), (4) Date: Jan. 25, 2008

(87) PCT Pub. No.: WO2006/132539

PCT Pub. Date: Dec. 14, 2006

(65) Prior Publication Data

US 2009/0120345 A1    May 14, 2009

(30) Foreign Application Priority Data

Jun. 6, 2005    (NO) .................................. 20052704

(51) Int. Cl.
*B63B 35/44* (2006.01)
(52) U.S. Cl. ...................... 114/264; 405/224
(58) Field of Classification Search ............. 114/264, 114/265, 266; 441/40; 405/202, 204, 223, 405/223.1, 224
See application file for complete search history.

(56) References Cited

U.S. PATENT DOCUMENTS

| 3,092,852 A | 6/1963 | Devereux |
| 5,549,445 A * | 8/1996 | Schremp ............... 415/2.1 |
| 6,431,107 B1 | 8/2002 | Byle |
| 6,766,643 B2 * | 7/2004 | Christensen ............ 60/398 |

(Continued)

FOREIGN PATENT DOCUMENTS

DE    103 37 997    3/2005

(Continued)

OTHER PUBLICATIONS

International Search Report issued Oct. 3, 2006 in the International (PCT) Application of which the present application is the U.S. National Stage.

(Continued)

*Primary Examiner*—Lars A Olson
(74) *Attorney, Agent, or Firm*—Wenderoth, Lind & Ponack, L.L.P.

(57) ABSTRACT

A method for coordinating a floating wind turbine installation. The wind turbine installation includes a buoyant body (1), a tower (2) arranged over the buoyant body, a generator (3) mounted on the tower which is rotatable in relation to the wind direction and fitted with a wind rotor (4), and an anchor line arrangement (5) connected to anchors or anchor points on the sea bed. Static heeling, $\phi_{s\_max}$, at full wind load on the wind turbine is as low as possible, but preferably less than 8 degrees, and all eigenperiods for the installation are outside the waves' period range. The eigenperiod in pitch, $T_{05}$ (roll, $T_{04}$), is preferably less than 80% of the $T_{03}$ eigenperiod in heave. Moreover, the ratio between $T_{03}$ and $T_{05}$ is not close to 0.5 or 1.

18 Claims, 2 Drawing Sheets

U.S. PATENT DOCUMENTS

| | | |
|---|---|---|
| 7,156,037 B2 * | 1/2007 | Borgen .................. 114/264 |
| 7,242,107 B1 * | 7/2007 | Dempster ................ 290/55 |
| 2004/0103655 A1 * | 6/2004 | Lauritsen ................ 60/398 |
| 2004/0169376 A1 * | 9/2004 | Ruer et al. .............. 290/55 |
| 2005/0229836 A1 | 10/2005 | Borgen |

FOREIGN PATENT DOCUMENTS

| | | |
|---|---|---|
| JP | 2002-188557 | 7/2002 |
| WO | 03/004869 | 1/2003 |
| WO | 2005/040604 | 5/2005 |

OTHER PUBLICATIONS

Patent Cooperation Treaty (PCT) International Preliminary Report on Patentability, issued Sep. 18, 2007 in International Application No. PCT/N02006/000207.

* cited by examiner

FLOATING WIND TURBINE INSTALLATION

BACKGROUND OF THE INVENTION

1. Technical Field

The present invention relates to a floating wind turbine installation and a method for coordinating the wind turbine installation's hydrostatic and hydrodynamic properties. The wind turbine installation comprises a buoyant body, a tower arranged over the buoyant body, a generator housing mounted on the tower which is rotatable in relation to the wind direction and fitted with a wind rotor, and an anchor line arrangement connected to anchors or anchor points on the sea bed.

2. Description of the Related Art

The development of floating, anchored wind turbines that can be used at great depths will strongly enhance access to areas for the expansion of wind energy at sea. Current technology for wind turbines located at sea is limited to permanently installed towers at low depths, i.e., under approximately 30 m.

Permanent installations at depths over 30 m generally result in technical problems and high costs. This has meant that, until now, sea depths of more than around 30 m have been regarded as technically and commercially unfavorable for the installation of wind turbines.

With floating solutions at greater sea depths, the foundation problem and costs associated with complicated, labor-intensive installations can be avoided.

In this connection, a great deal of work is being done to develop floating solutions. However, it is difficult to find solutions that are technically satisfactory and financially viable.

SUMMARY OF THE INVENTION

The present invention represents a solution that makes it possible to achieve a combination of material use, geometric and dimensional design and structural solutions that produces satisfactory technical solutions and sufficiently low costs to make the concept financially attractive.

The concept is based on a long (deep), slim, preferably cylindrical solution for the buoyant body for a floating wind turbine installation which, by its nature, is designed to result in small movements in waves. Another precondition is a large displacement in relation to the weight of the tower and turbine. This is necessary in order to achieve the correct mass and weight distribution in respect of the required dynamic properties and stability.

The large displacement and high strength required for deeply immersed structures can be achieved, in accordance with the present invention, in a simple, cost-effective manner by using concrete in a cylindrical underwater part. Concrete is a cheap material. By systematizing and organizing the construction methods for series production, the labor costs will be very low.

Another important precondition for low overall costs is the need to avoid extensive work with expensive auxiliary vessels when the individual turbines are installed at sea. This is achieved in that the entire turbine can be towed out fully assembled and anchored with a simple anchor system.

Assembly and commissioning can take place at a protected construction site with permanent installation equipment. This is subject to there being towing routes with sufficient draught from the construction site to the installation site. This is the case, in particular, in Norway and has previously been used for large concrete platforms.

The method in accordance with the present invention is characterized in that the static heel, $\phi_{s\_max}$, at full wind load on the wind turbine must be as low as possible, preferably less than 8 degrees, and that all eigenperiods for the installation are outside the waves' energy-rich period range. The eigenperiods in heave, $T_{03}$, and pitch, $T_{05}$ (roll $T_{04}$), have sufficient distance from each other in that the eigenperiod in pitch (roll) is preferably less than 80% of the eigenperiod in heave. The ratio between $T_{03}$ and $T_{05}$ must not be close to 0.5 or 1.

Moreover, the floating wind turbine installation in accordance with the present invention is characterized in that the buoyant body consists of a preferably cylindrical, extended, slim concrete structure and the tower consists of a preferably cylindrical steel structure.

BRIEF DESCRIPTION OF THE DRAWINGS

The present invention will be described in further detail in the following with reference to the attached drawings, where.

DETAILED DESCRIPTION OF THE INVENTION

Figure 1:
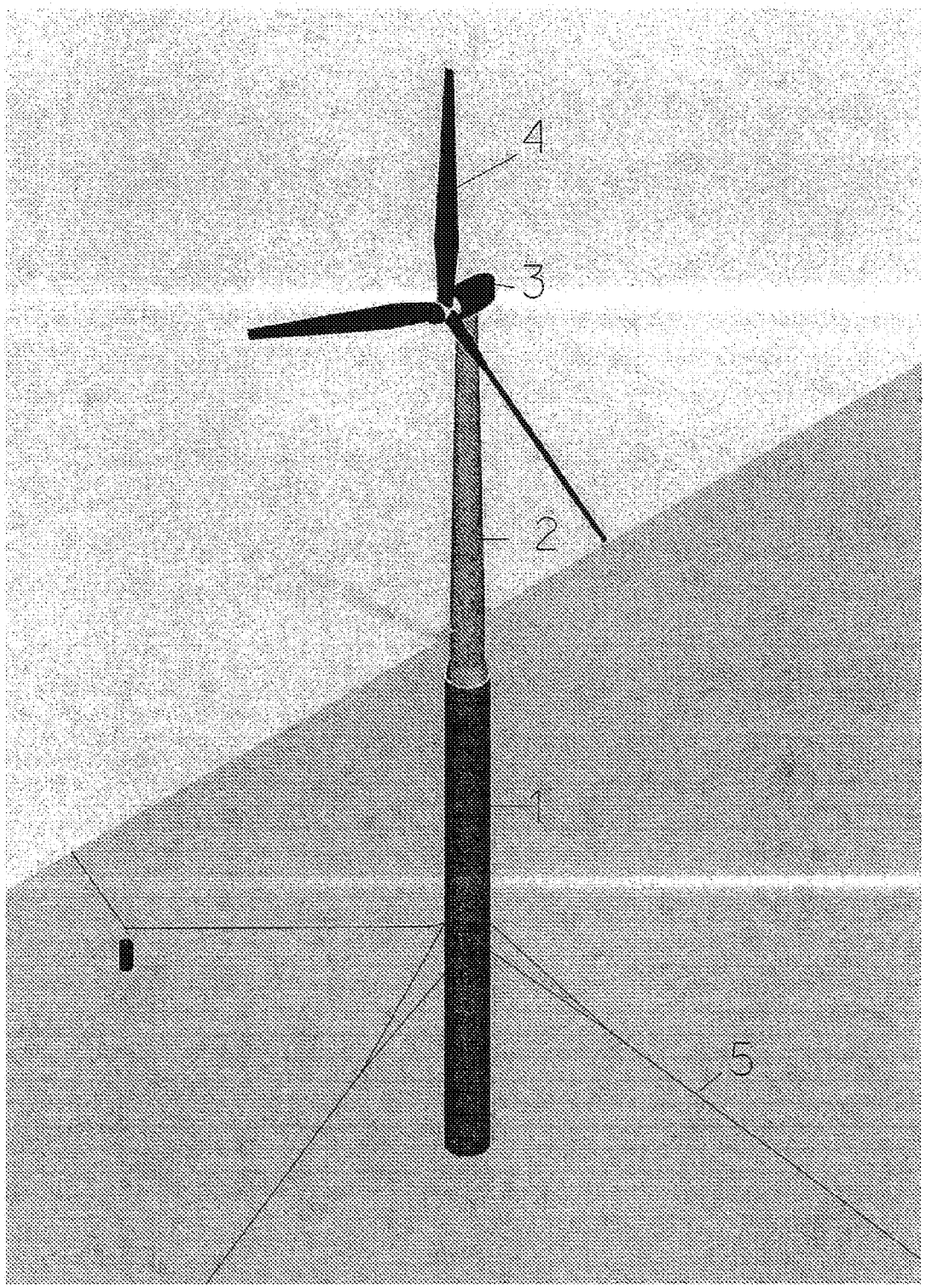
FIG. 1 shows the design of a floating wind turbine installation.
Figure 2:
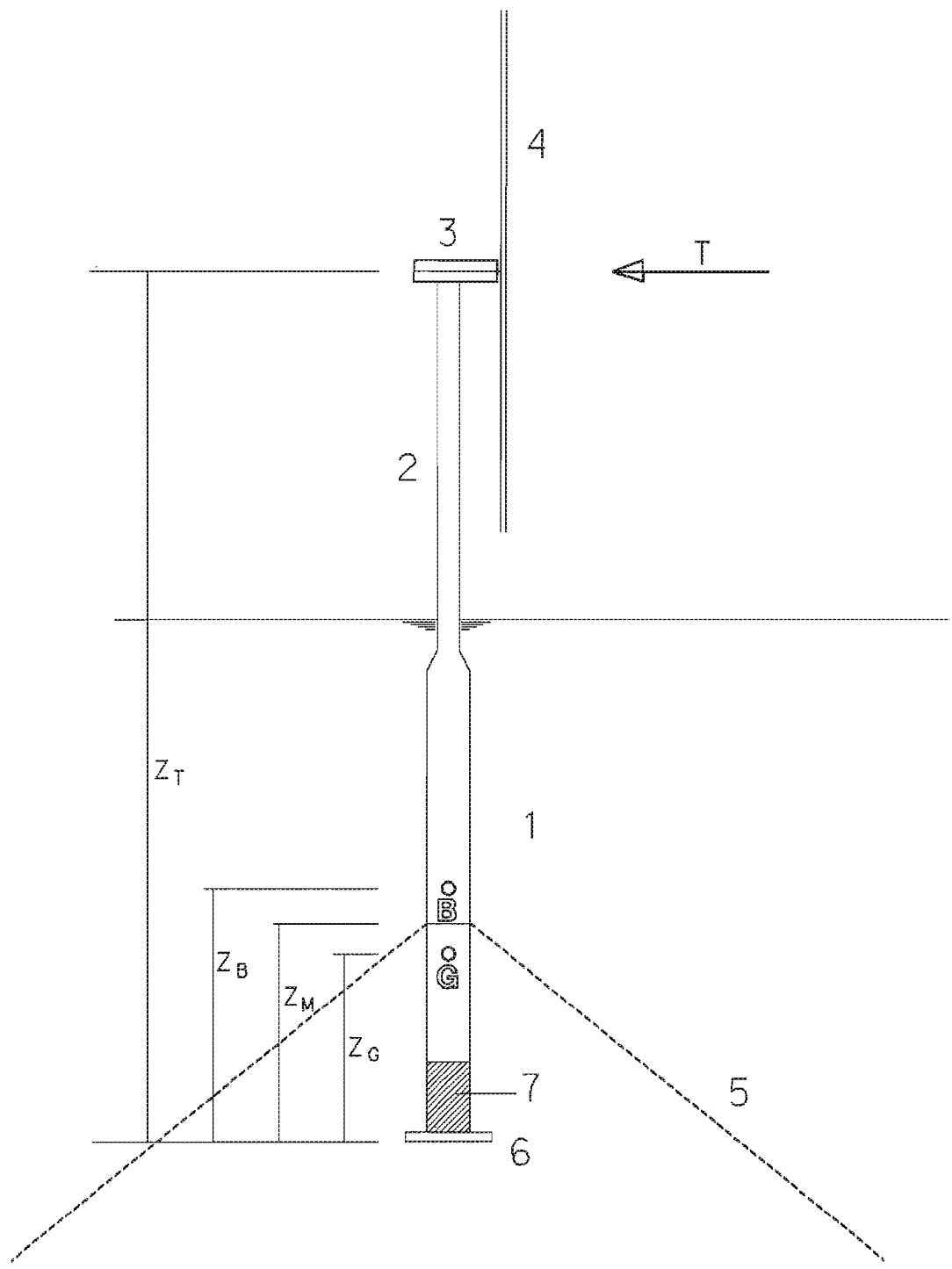
FIG. 2 shows a simplified elevation of a wind turbine installation with an alternative embodiment associated with the design of the lower part of the buoyant body.

A floating wind turbine installation will primarily, as shown in FIG. 1 and FIG. 2, consist of an anchored floating foundation or buoyant body 1 that supports a high tower 2 with a wind turbine mounted on top of it. The wind turbine includes a generator housing 3 that encloses a power generation unit (not shown) and a rotor 4 arranged in connection with this unit. A major factor is that the floating foundation moves with the waves, which, in itself, is negative in relation to operation of the turbine and load on the tower. Another factor is that, on account of limited stability, the wind turbine installation will also heel when subject to wind force.

The main challenge in connection with the development of a floating wind turbine installation is, consequently, to minimize movement in waves and achieve optimum stability, while keeping costs low.

The cost is associated with the size of the installation. Consequently, an attempt will normally be made to achieve a concept with minimum material consumption. The best solution for minimizing wave-induced movement and achieving small size is to use a deep, slim buoyant body that preferably consists of a cylindrical underwater body. The concept has two characteristic movements, heave and pitch (roll). Heave is a purely vertical movement and pitch (roll) is a rotational movement with a center of rotation roughly at the center of gravity of the entire installation. Roll and pitch each take place around their own orthogonal, horizontal axis. To avoid large heave and pitch movements, it is important to place the eigenperiods so that they lie outside the range in which the waves have a lot of energy. In practice this means that the eigenperiods should be over 23-24 seconds for the two movement modes. At the same time, the eigenperiods must have sufficient distance from each other to avoid the movements becoming linked.

Good stability is required to achieve small heel angles for the turbine in operation. The stabilizing effect is produced by displacement and the center of gravity. Large displacement and a low center of gravity produce large corrective forces and, consequently, small heel angles under wind load. High stability will, however, produce a low pitch (roll) period. To achieve maximum stability with satisfactory pitch (roll)

movement, the concept in accordance with the present invention is designed so that the pitch (roll) period is right above the range in which the waves have a lot of energy, approximately 25-26 seconds. To avoid a link between heave and pitch (roll), the heave period must be at a sufficient distance above the pitch (roll) period, approximately 30-31 seconds.

Another consideration is the dimensioning of the tower. To achieve maximum tower strength, it must have a large diameter in the lower part that passes through the surface of the water.

The heave period is the ratio between the displacement and the water plane area of the tower. Therefore, a specific displacement is required to achieve a heave period of 30 seconds. Correct coordination of the dimensions and ballast was achieved by means of a parameter study that included dimensioning calculations and dynamic analysis.

The floating wind turbine installation must, therefore, be designed so that the requirements for both static and dynamic properties are met. The requirements are associated, in particular, with the interaction between vertical displacement and movement (heave) and rotation around a horizontal axis, pitch (roll). On the basis of the above, this is a summary of the requirements:

The displacement ($\rho g V$) must be large enough to support the weight of the structure (Mg) plus vertical forces from the anchor.
1. The system must have sufficient static stability (initial stability and area under the "GZ curve").
2. Static heeling at full wind bad on the wind turbine must be less than a specific value, $\phi_{s\_max}$, and must be as low as possible, preferably less than 8°.
3. All eigenperiods must be outside the waves' energy-rich period range.
4. The eigenperiods in heave, $T_{03}$, and pitch, $T_{05}$ (roll $T_{04}$), must have a sufficient distance from each other.
5. The ratio $T_{03}/T_{05}$ must be different from and at a good distance from 0.5 and 1.0. Otherwise, the result might be parametric excitation of resonance movements.

It must generally be assumed that requirements 1 and 2 are met. The static heeling on the basis of 3 above is approximately given by:

$$\varphi_s = \frac{T(z_T - z_m)}{\rho g V(z_B - z_G)} = \frac{T(z_T - z_m)}{C_{55}} \qquad [1]$$

It is assumed here that the buoyant body is a vertical, column-shaped structure with a depth much greater than its width. $z_T$ is the vertical coordinate of the rotor's axis. $z_m$ is the vertical coordinate of the anchor points. This point will lie close to the system's center of gravity, which has the vertical coordinate $z_G$. $z_B$ is the vertical coordinate of the center of buoyancy. V is the floating bodies' volume displacement. $\rho$ is the water density and g is gravitational acceleration. Requirement 3 will now mean that we must have a sufficiently large displacement combined with a large $GB=(z_B-z_G)$.

The eigenperiod in pitch (and equivalent roll) is approximately given by:

$$T_{05} \approx 2\pi\sqrt{\frac{I_{55} + A_{55}}{C_{55}}} \qquad [2]$$

Here, $I_{55}$ and $A_{55}$ are mass moment of inertia and hydrodynamic moment of inertia, respectively, about the system's dynamic axis of rotation. This is near $z_G$. More exact values are obtained by considering the linked heave/pitch movement. Equations [1] and [2] show that high rigidity, $C_{55}$, contributes to keeping the heel angle down but, at the same time, the eigenperiod in pitch will be reduced as $C_{55}$ increases. It is, therefore, necessary to aim to keep $I_{55}+A_{55}$ sufficiently high to avoid $T_{05}$ coming into conflict with the wave periods. This can be achieved by making the hull deep and slim, as indicated above.

The eigenperiod in heave is approximately given by:

$$T_{03} \approx 2\pi\sqrt{\frac{M + A_{33}}{C_{33}}} \qquad [3]$$

Where $C_{33}=\rho A_{WL}g$. $A_{WL}$ is the waterline area. In addition, there is the effect of the vertical rigidity of the anchor lines. M is the mass of the buoyant body. For a long, slim buoyant body, $A_{33}<<M$. This shows that a high eigenperiod in heave is achieved by having a large displacement and a low waterline area.

From this, it can be concluded that the requirements under 4 and 5 above can be combined if the displacement is made sufficiently large. However, increased displacement will increase the costs. Therefore, it is necessary to find a combination of properties that allows simple hull geometry, with sufficient displacement to meet the requirements outlined.

If we return to equation [1] and assume a rotor diameter of the wind turbine of in the order of 100 m, for example, and that GB is in the order of 10 m, we can see that we need a displacement of in the order of 100 times the static thrust from the wind turbine if the static heeling is to be kept below 0.1 radian (5.7 degrees). Thus, with a 5 MW turbine, we need a displacement on the order of 6000-8000 metric tons.

With the displacement specified, the eigenperiod in heave will be controlled by the waterline area. It has been decided to make this period close to 30 seconds. This makes it possible to place the eigenperiod in pitch between the wave periods and the eigenperiod in heave. (For Norwegian sea areas, the typical period range for waves is from approximately 4 seconds to approximately 20 seconds.) Therefore, the requirements under 4 and 5 above are met and the static heeling requirement is met.

To be able to place the eigenperiod in pitch in the range 22-28 seconds and also to have sufficient static stability, the aim must be to have a large GB value, while $I_{55}+A_{55}$ has a sufficiently low value, ensuring that 22 sec.<$T_{05}$<28 sec. This can be achieved by placing the ballast 7 a little below the center of buoyancy of the buoyant body. The ballast must be placed so that the requirements for center of gravity location and moment of inertia are combined.

On the basis of the above, it is particularly expedient to produce the buoyant body as a preferably cylindrical, extended, slim body in concrete and to make the tower a preferably cylindrical body in steel. The buoyant body can expediently have a length (draught) of 100-150 m.

The displacement of the buoyant body can be reduced by introducing a "lip" or radial projection 6 in the base of the buoyant body, as shown in FIG. 2. This lip 6 can be arranged in such a way that the diameter of the base plate is made larger than the diameter of the rest of the buoyant body. Such a lip will have the following effect on the dynamic properties:

In relation to an upright column, the eigenperiod in heave will increase on account of the increased hydrodynamic mass in a vertical direction. Or the same eigenperiod in heave can be achieved with a reduced displacement.

It is possible to retain a low center of gravity without the moment of inertia in pitch (roll) increasing. This results in the freedom to give the eigenperiod in pitch (roll) an expedient value and retain the static properties.

The invention claimed is:

1. A floating wind turbine installation comprising:
a buoyant body;
a tower arranged over the buoyant body;
a generator housing mounted on the tower, the generator being rotatable in relation to a wind direction;
a wind rotor fitted to the generator housing; and
an anchor line arrangement for connecting to anchors or anchor points on a sea bed, wherein:
static heeling, $\phi_{s\_max}$ of the installation at full wind load on the wind turbine installation is less than a specified value;
eigenperiods in heave, $T_{03}$, and pitch, $T_{05}$ and/or roll, $T_{04}$, have a ratio such that $T_{05}$ and/or $T_{04}$ is less than $T_{03}$; and
a ratio between $T_{03}$ and $T_{05}$ is not close to 0.5 or 1.

2. A floating wind turbine installation as claimed in claim 1, wherein static heeling $\phi_{s\_max}$ of the wind turbine installation at full wind load is less than 8 degrees.

3. A floating wind turbine installation as claimed in claim 1, wherein the wind turbine installation is designed, in terms of dimensions and weight distribution, such that the eigenperiod in pitch is in the range of 22-28 seconds and the corresponding eigenperiod in heave is in the range of 30-35 seconds.

4. A floating wind turbine installation as claimed in claim 2, wherein the wind turbine installation is designed, in terms of dimensions and weight distribution, such that the eigenperiod in pitch is in the range of 22-28 seconds and the corresponding eigenperiod in heave is in the range of 30-35 seconds.

5. A floating wind turbine installation as claimed in claim 1, wherein the buoyant body is an elongated concrete structure and the tower is a steel structure.

6. A floating wind turbine installation as claimed in claim 2, wherein the buoyant body is an elongated concrete structure and the tower is a steel structure.

7. A floating wind turbine installation as claimed in claim 3, wherein the buoyant body is an elongated concrete structure and the tower is a steel structure.

8. A floating wind turbine installation as claimed in claim 5, wherein the buoyant body is cylindrical.

9. A floating wind turbine installation as claimed in claim 6, wherein the buoyant body is cylindrical.

10. A floating wind turbine installation as claimed in claim 7, wherein the buoyant body is cylindrical.

11. A floating wind turbine installation as claimed in claim 6, wherein the tower is cylindrical.

12. A floating wind turbine installation as claimed in claim 8, wherein the tower is cylindrical.

13. A floating wind turbine installation as claimed in claim 1, wherein the buoyant body is fitted, at its lower end, with a radial projection or lip that extends beyond the circumference of a top part of the buoyant body.

14. A floating wind turbine installation as claimed in claim 1, wherein the buoyant body has a length of 100-150 m.

15. A floating wind turbine installation as claimed in claim 1, wherein the buoyant body has a diameter that is greater than a diameter of the tower.

16. A method of designing a floating wind turbine installation, the installation including a buoyant body, a tower arranged over the buoyant body, a generator housing mounted on the tower and being rotatable in relation to a wind direction, a wind rotor fitted to the generator housing, and an anchor line arrangement for connecting to anchors or anchor points on a sea bed, the method comprising determining dimensions and weight distribution for the installation such that:
static heeling, $\phi_{s\_max}$, of the wind turbine installation at full wind load on the wind turbine installation is less than a specified value;
eigenperiods in heave, $T_{03}$, and pitch, $T_{05}$, and/or roll, $T_{04}$, have a ratio such that $T_{05}$ and/or $T_{04}$ is less than $T_{03}$; and
a ratio between $T_{03}$ and $T_{05}$ is not close to 0.5 or 1.

17. A method as claimed in claim 16, wherein the installation is designed such that static heeling $\phi_{s\_max}$, of the wind turbine installation at full wind load on the wind turbine installation is less than 8 degrees.

18. A method as claimed in claim 16, wherein the wind turbine installation is designed, in terms of dimensions and weight distribution, such that the eigenperiod in pitch is in the range of 22-28 seconds and the corresponding eigenperiod in heave is in the range of 30-35 seconds.

* * * * *